W. H. FULLINGTON.
SWIVEL.
APPLICATION FILED AUG. 22, 1921.
1,432,059.    Patented Oct. 17, 1922.
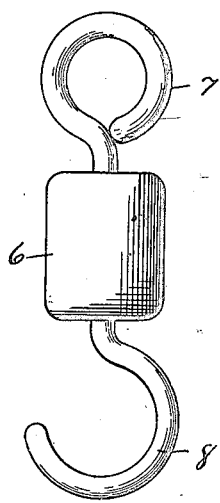
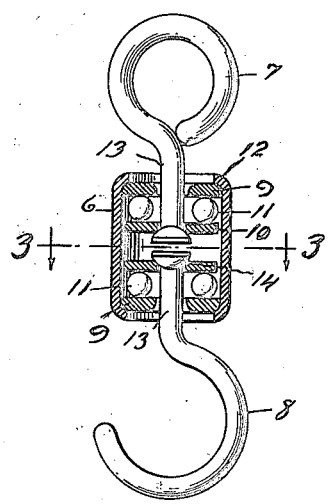
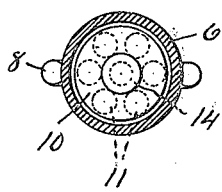

Patented Oct. 17, 1922.

1,432,059

UNITED STATES PATENT OFFICE.

WILLIAM H. FULLINGTON, OF CLEVELAND, OHIO.

SWIVEL.

Application filed August 22, 1921. Serial No. 494,270.

*To all whom it may concern:*

Be it known that I, WILLIAM H. FULLINGTON, a citizen of the United States, residing at Cleveland in the county of Cuyahoga and State of Ohio, have invented certain new and useful Improvements in Swivels, of which the following is a specification.

This invention relates to swivels or swivel hooks, and it is particularly useful in connection with swivel hooks used in rope making, where the rope in formation is connected to the swivel and is then revolved to twist the strands.

The object of the present invention is to provide an improved swivel hook characterized by very little friction, which is highly desirable in the operation above referred to and doubtless also in other situations. Accordingly ball bearings are provided for the shanks of the attaching members, such as the hook or eye.

One form of the invention is illustrated in the accompanying drawings in which Fig. 1 is a plan of the swivel. Fig. 2 is a longitudinal section thereof. Fig. 3 is section on the line 3—3 of Fig. 2.

Referring specifically to the drawings, 6 indicates an outer cylinder or shell, made of metal, 7 is an eye for connecting one end of the swivel and 8 is a hook for connecting the other end.

Each end of the cylinder 6 contains a bearing, and each bearing consists of an outer ring 9, an inner ring 10 and balls 11 between the two rings. The outer ring 9 seats or abuts against a flange 12 up-set or turned inwardly at the end of the cylinder 6, so that the bearing will not pull out of the cylinder. The inner ring 10 is relatively loose. The shank 13 of either the eye 7 or the hook 8 extends through the rings of the respective bearings, and is enlarged, shouldered, or headed behind the inner ring 10, as indicated at 14, so that it will not pull through said ring.

This construction permits a free rotation between the parts 7 and 8, each being provided with a ball bearing which permits a very free spin desirable in rope twisting and elsewhere. The invention provides a swivel remarkably free from binding friction and successfully accomplishes the intended purpose.

I claim:

A swivel comprising a cylinder open at each end, an outer bearing ring seated in each end of the cylinder, an inner bearing ring beside each outer ring, balls between the inner and outer rings respectively, an attaching member having a shank projecting through the outer and inner rings at one end of the cylinder, the inner end of the shank being enlarged to engage behind the inner ring, and the outer end thereof ending in a ring, another shank projecting through the outer and inner rings at the other end of the cylinder, the inner end of said shank being enlarged to engage the inner ring and the outer end thereof terminating in a hook, and the ends of the cylinder being crimped over to hold the working parts.

In testimony whereof, I affix my signature in presence of two witnesses.

WILLIAM H. FULLINGTON.

Witnesses:
    I. F. BURTON,
    BESSIE F. POLLAK.